(12) United States Patent
Robertsson et al.

(10) Patent No.: US 7,050,355 B2
(45) Date of Patent: May 23, 2006

(54) DETERMINING THE ORIENTATION OF A SEISMIC RECEIVER, A SEISMIC RECEIVER, AND A METHOD OR SEISMIC SURVEYING

(75) Inventors: Johan O. A. Robertsson, Fulbourn (GB); Remco Muijs, Zurich (CH)

(73) Assignee: Westerngeco, L.L.C., Houston, TX (US)

( * ) Notice: Subject to any disclaimer, the term of this patent is extended or adjusted under 35 U.S.C. 154(b) by 0 days.

(21) Appl. No.: 10/471,494

(22) PCT Filed: Mar. 12, 2002

(86) PCT No.: PCT/IB02/01897

§ 371 (c)(1),
(2), (4) Date: Mar. 16, 2004

(87) PCT Pub. No.: WO02/073239

PCT Pub. Date: Sep. 19, 2002

(65) Prior Publication Data

US 2004/0141355 A1    Jul. 22, 2004

(30) Foreign Application Priority Data

Mar. 13, 2001    (GB) .................................... 0106091

(51) Int. Cl.
*G01V 1/38*    (2006.01)
(52) U.S. Cl. ............................ 367/19; 367/15; 367/16; 367/21; 367/24
(58) Field of Classification Search ............... 367/15, 367/16, 19, 21, 24, 145; 33/313
See application file for complete search history.

(56) References Cited

U.S. PATENT DOCUMENTS 4,222,266 A * 9/1980 Theodoulou ................ 367/100

4,611,312 A * 9/1986 Ikeda ......................... 367/38

(Continued)

FOREIGN PATENT DOCUMENTS

GB    2 349 468    11/2000

OTHER PUBLICATIONS

Hawkes, et al. "Effect of Sensor Placement on Acoustic Vector-Sensor Array Performance." IEEE Journal of Oceanic Engineering. Jan., 1999.*

(Continued)

*Primary Examiner*—Jack Keith
*Assistant Examiner*—Scott A. Hughes
(74) *Attorney, Agent, or Firm*—Westerngeco L.L.C.

(57) ABSTRACT

The invention provides a method of determining the orientation of a seismic receiver (4, 6) from seismic data acquired at the receiver (4, 6). The determined orientation can be taken into account in subsequent analysis of the seismic data. This avoids inaccuracies that can occur if the receiver orientation is estimated. In a preferred embodiment the horizontal spatial derivatives of the pressure measured at the receiver are used in the determination of the orientation of the receiver. These may be calculated on either the source side or the receiver side. These are combined with horizontal components of the particle displacement, velocity or acceleration (or a higher time-derivative of the particle displacement). Alternatively, horizontal spatial derivatives of the particle displacement measured at the receiver may be used in place of the horizontal spatial derivatives of the pressure. The invention also provides a seismic receiver (6) having three or more closely-spaced, non-collinear pressure sensors (8, 9, 10). The provision of three or more pressure sensors enables the horizontal spatial derivatives of the pressure to be determined accurately.

28 Claims, 9 Drawing Sheets

U.S. PATENT DOCUMENTS

| | | | |
|---|---|---|---|
| 4,766,574 A * | 8/1988 | Whitmore et al. | 367/41 |
| 4,855,962 A * | 8/1989 | Regnaudin et al. | 367/19 |
| 4,995,013 A | 2/1991 | Dumaine et al. | 367/153 |
| 5,193,077 A * | 3/1993 | Weiglein et al. | 367/21 |
| 5,226,017 A * | 7/1993 | Fortin | 367/25 |
| 5,757,722 A * | 5/1998 | Zinn | 367/19 |
| 5,835,451 A * | 11/1998 | Soubaras | 367/21 |
| 6,061,298 A * | 5/2000 | Madtson et al. | 367/21 |
| 6,131,694 A | 10/2000 | Robbins et al. | 181/105 |
| 6,166,994 A | 12/2000 | Jeffryes | 367/57 |
| 6,205,403 B1 * | 3/2001 | Gaiser et al. | 702/14 |
| 6,292,754 B1 * | 9/2001 | Thomsen | 702/14 |
| 2003/0147306 A1 * | 8/2003 | Robertsson | 367/24 |

OTHER PUBLICATIONS

Amundsen. "Elimination of free surface related multiples without need of the source wavelet." Geophysics, vol. 66 (Jan.-Feb. 2001).*

Silawongstat, et al. :Suppresson of downcoming waves at the ocean bottom witha scalar combination of hydrophone and geophone data. SEG 2000 Expanded Abstracts.*

Barr, Fred. "Dual-sensor OBC technology." The Leading Edge, Jan. 1997.*

International Search Report dated Sep. 4, 2002 (PCT/IB02/01897).

* cited by examiner

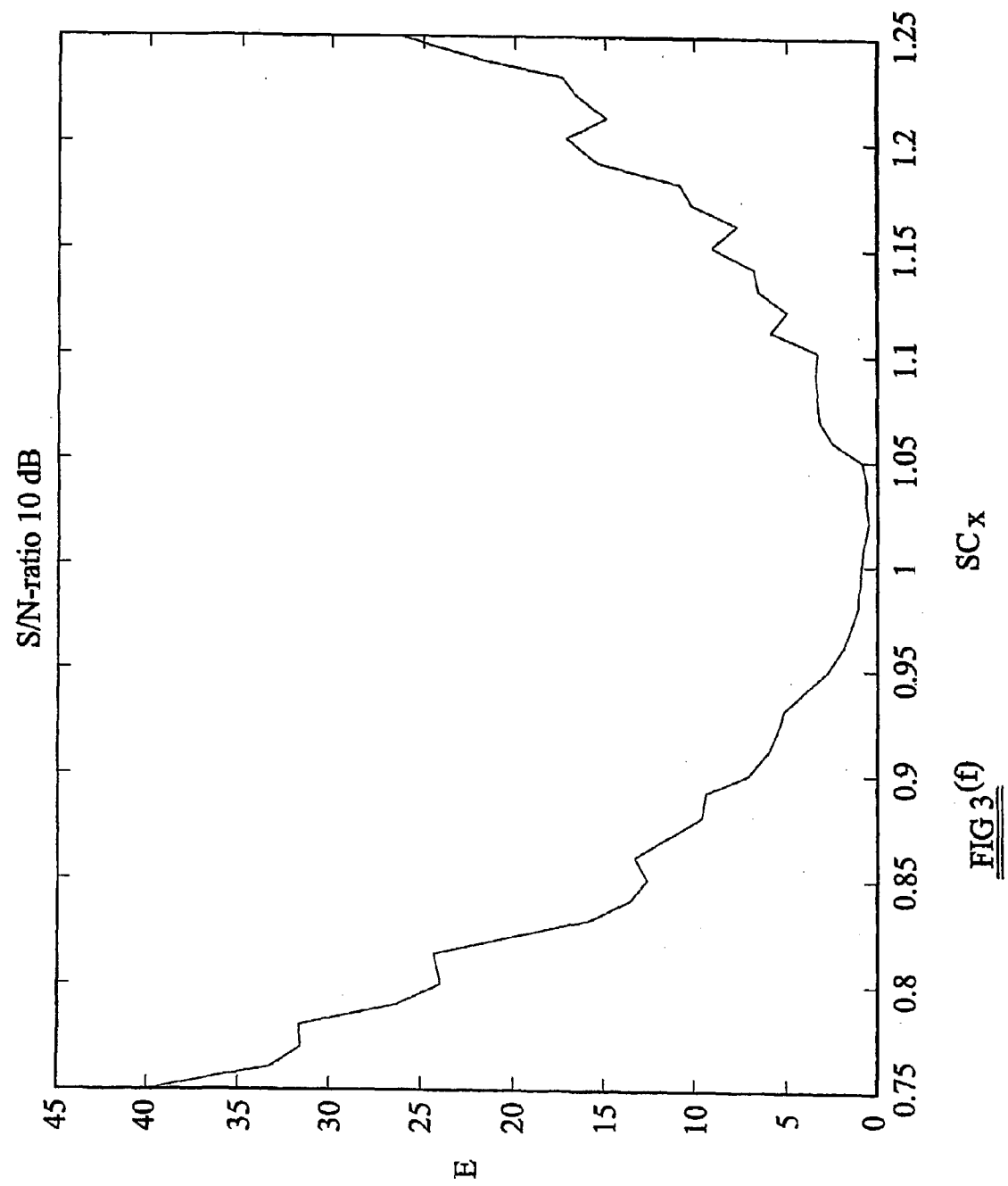

DETERMINING THE ORIENTATION OF A SEISMIC RECEIVER, A SEISMIC RECEIVER, AND A METHOD OR SEISMIC SURVEYING

The present invention relates to a method of determining the orientation of a seismic receiver, in particular to a method of determining the heading (that is, the orientation in a horizontal plane) of a multi-component seismic receiver. The invention can be applied to, for example, a receiver disposed on the earth's surface, to a receiver being towed through water, or to a receiver disposed within a borehole. The term "earth's surface" as used herein includes the sea-bed, land, and the transition zone. The invention also relates to a seismic receiver, and to a method of seismic surveying using such a seismic receiver.

A seismic receiver generally comprises one or more seismic sensing elements disposed within a housing. When the receiver is deployed in a desired survey location by being disposed on the earth's surface, the coupling of the seismic sensing element(s) to the earth is provided by the housing of the receiver; the housing also provides physical protection for the sensing element(s). Receivers of this general type are generally used by attaching the receiver housings to a support cable at intervals along the length of the cable. The support cable is provided with electrical leads to enable output signals from the receivers to be transmitted to monitoring and/or recording equipment, and to enable power to be provided to the receivers. For a land-based survey, the cable is disposed on the land so that the receivers are located at their desired positions. In the case of sea-bed seismic data acquisition, the cable is lowered onto the sea-bed to deploy the receivers at their desired locations on the sea-bed. Alternatively, in the case of a towed marine receiver array, the cable is suspended at a desired depth below the water surface and is towed through the water, for example by a survey vessel. As a further alternative, the cable may be deployed within a borehole to provide a VSP (vertical seismic profile) receiver array. Receivers may also be deployed without being attached to a cable. For instance, autonomous sensors can record and store data locally, for example on a hard disk, for later retrieval, or can transmit data, for instance via radio, to another location for recordal there.

A seismic receiver provided with two or more seismic sensing elements is able to measure two or more parameters of the received seismic energy, and is thus known as a multi-component seismic receiver. One application of multi-component seismic receivers is as sea-bed seismic receivers—that is, as receivers intended to be disposed on the sea-bed. Sea-bed seismic receivers generally record the pressure and the elastic wavefield of the seismic energy incident on the receiver. The pressure is a scalar quantity, whereas the elastic wavefield is a vector quantity and it is therefore necessary to measure the components of the elastic wavefield in three non-coplanar directions. This is done using a three-component geophone that can measure the components of the wavefield in three non-coplanar directions. The three directions chosen are usually the x-direction, the y-direction, and the z-direction (vertical). In total, therefore, four components of the seismic data are measured. Four-component seismic data recording at the sea-bed has proven to be a very successful method for imaging through gas saturated overburdens and for characterising hydrocarbon reservoirs through lithology identification and fluid discrimination. The multi-component data describing the elastic wavefield are especially useful, since they enable the separation of the compressional P-waves from the shear S-waves.

In a conventional sea-bed acquisition system the receivers are firmly coupled to the cable, so that the orientation of each receiver, relative to the cable, is known. Usually, each receiver is aligned on the cable so that one sensing element records the component of the elastic wavefield along the cable (this is also known as the in-line direction, and is generally taken to be the x-direction), and another records the component of the wavefield transverse to the cable (this is also known as the cross-line direction, and is generally taken to be the y-direction). The third sensing element records the vertical component of the wavefield.

In a conventional receiver array, the orientation of each receiver on the cable is defined when the receiver is attached to the cable, so that the receiver heading is defined before the cable is deployed. Thus, the heading of each receiver can in principle be determined from its position on the cable. However, twisting and coiling of the support cable may occur as the cable is deployed, and this would mean that actual heading of a receiver may be different from the theoretical heading determined from the receiver's position on the cable. Furthermore, new seabed acquisition systems are being designed in which the receivers are decoupled from the cable. In these new acquisition, systems, although each receiver will still measure the components of the wavefield along its internal x- and y-axes, knowledge of the receiver's position on the cable will not be sufficient to determine the orientation of the receiver's x- and y-axes. Thus, determining the receiver's heading from its position on the cable may well be inaccurate, with a possibly severe effect on the quality of the results of processing the data.

Determining the receiver heading solely from the receiver's position is not possible in the case of an autonomous receiver.

A first aspect of the present invention provides a method of determining the orientation of a seismic receiver, the method comprising: acquiring seismic or acoustic data at a receiver, the data including at least one of pressure and the particle displacement or a time-derivative of the particle displacement; and determining the orientation of the receiver from at least one of the pressure measured at the receiver and the particle displacement or time-derivative of the particle displacement measured at the receiver.

The present invention thus eliminates the need to estimate the heading of a receiver from its position on a support cable. Instead, the heading can be determined from. seismic or acoustic data acquired by the receiver, and this allows more accurate determination of the heading of a seismic receiver. The invention enables the receiver heading to be determined even in the absence of any prior knowledge about the heading of the receiver, and is of particular benefit when applied to an acquisition system in which the receivers are decoupled from a support cable or in which autonomous receivers are used.

Once the heading of the receiver has been determined, seismic data acquired by the receiver can be processed in any conventional way. The processing can take account of the determined heading of the receiver, thereby improving the accuracy of the data processing.

In the method of the invention, the heading of the receiver is determined from at least one of the pressure measured at the receiver and the particle displacement, or a time-derivative thereof, measured at the receiver. The most convenient time-derivatives of the particle displacement to use are the particle velocity (i.e. the first time-derivative) and the particle acceleration (i.e. the second time-derivative) but, in principle, higher order time-derivatives could be used.

In a preferred embodiment the spatial derivatives, in first and second different horizontal directions, of the pressure measured at the receiver are used in the determination of the receiver orientation. Components of the particle displacement, or particle velocity, or particle acceleration, measured at the receiver in the first and second horizontal directions may also be used in the determination of the receiver orientation. The spatial derivatives, in the first and second horizontal directions, of the particle displacement measured at the receiver may be used instead of the spatial derivatives of the pressure.

Faithful recording of the pressure and elastic wavefield is essential for a fall and correct analysis of the seismic data obtained in a multi-component seabed seismic survey. Acquired seismic data can receive the full benefit of vector processing techniques, such as wavefield decomposition schemes, only if they provide a good vector representation of the wavefield. In practice, variations in geophone and hydrophone coupling, resonances in the receiver cable, and incorrect receiver orientation can affect the recordings.

One particular problem that occurs in processing data acquired by a multi-component seismic sensor is that of vector infidelity. By "vector infidelity" is meant that one or more components of the recorded wavefield is/are distorted compared to the true particle motion. Sub-optimal design of the sensor housing or of the cable can cause such distortions, which tend to be particularly severe for specific components of the recorded data. In particular, infidelity between the in-line (x-direction) and cross-line (y-direction) components of the elastic wavefield can be a serious problem.

Various techniques for correcting for vector infidelity have been proposed. For example, J. E. Gaiser, in "Compensating OBC data for variations in geophone coupling", 68$^{th}$ Ann. Internat. Mtg, Soc. Expl. Geophys. pp 1429–1432 (1998), and C. Bagaini et al, in "Assessment and calibration of horizontal geophone fidelity in seabed-4C using shear waves", 62nd EAGE Conference Glasgow, Extended Abstracts, paper L02 (2000), have proposed techniques for calibrating the recordings of different components of the wavefield in order to correct for vector infidelity. These techniques rely upon the minimisation of transverse energy, assuming all energy to travel in the radial-vertical plane. Both schemes, however, define the radial direction as the direction from source to receiver, which implicitly assumes that the earth is laterally invariant. This assumption means that any subsurface structures present will cause systematic uncertainties in the calibration filters, as pointed out by Gaiser (supra).

The errors in the calibration filters have hitherto been minimised statistically, but this can be done only if the acquired data has a good azimuth coverage. The present invention, however, makes it possible to perform a correct receiver calibration without the assumption of a 1-D earth model, for any number of shots with an arbitrary azimuth coverage.

A second aspect of the present invention provides a seismic receiver comprising three or more pressure sensing elements, the positions of the pressure sensing elements not being collinear. Such a receiver can provide information about the spatial derivatives of the pressure, and this information can be used in a determination of the heading of the receiver. Seismic data acquired by a receiver according to the second aspect of the invention can be processed by a method according to the first aspect of the invention to determine the receiver orientation.

A third aspect of the present invention provides a method of seismic-surveying comprising: emitting seismic energy at a first location; and acquiring seismic data at a seismic receiver of the-type defined above disposed at a second location different from the first location.

Some or all of the seismic data acquired by a seismic surveying method of the third aspect of the invention can be processed according to a method of the first aspect of the invention so as to determine the orientation, in particular the heading, of the receiver used to acquire the data. Subsequent processing of the acquired seismic data can take account of the determined receiver heading.

Other preferred features of the present invention are set out in the dependent claims.

Preferred embodiments of the invention will now be described by way of illustrative example with reference to the accompanying Figures in which:

FIG. 3($b$) illustrates a second energy function for the data of FIG. 3($a$);

Figure 3A:
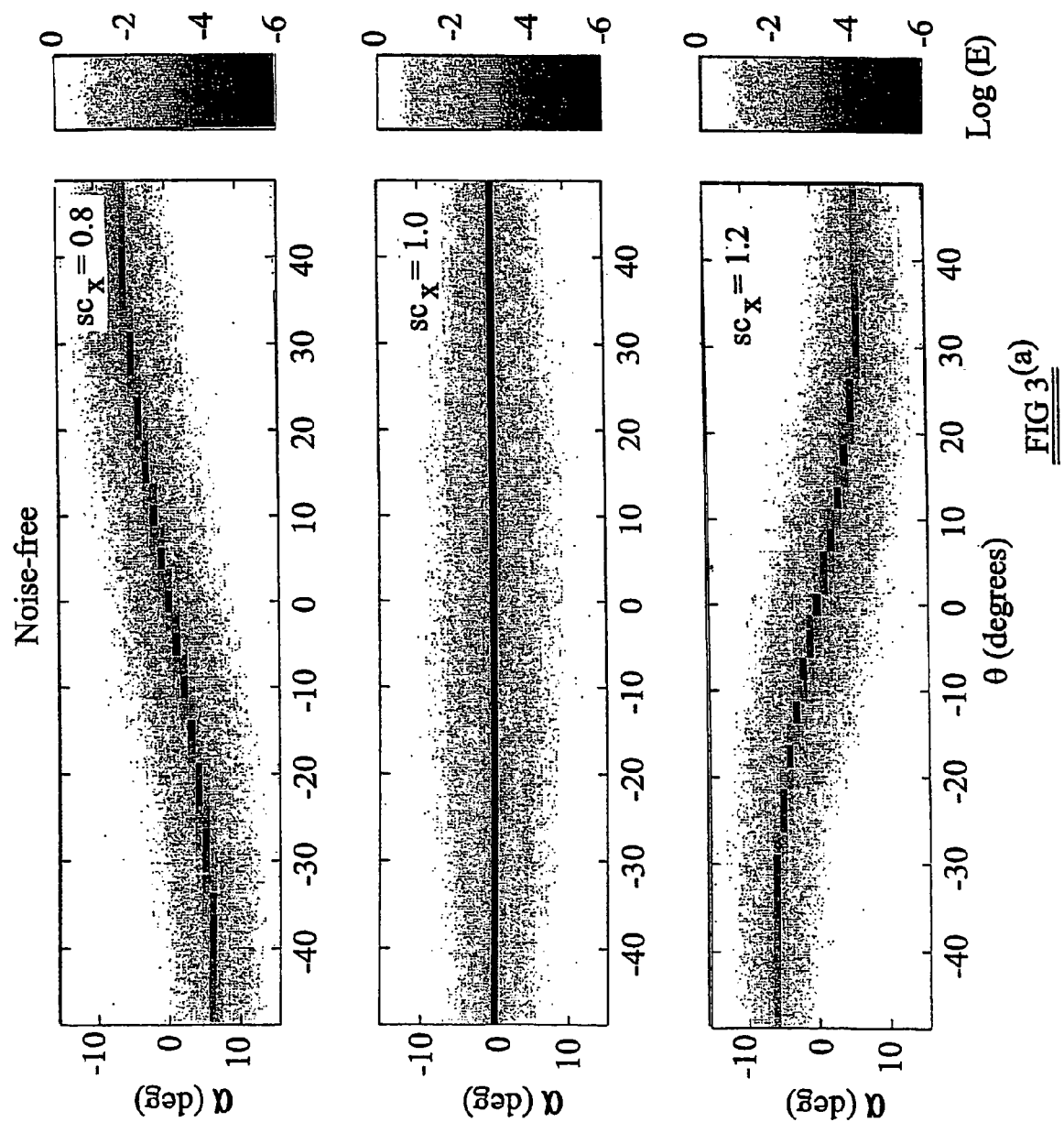
FIG. 3($a$) illustrates a first energy function obtained for noise-free synthetic seismic data.
Figure 3B:
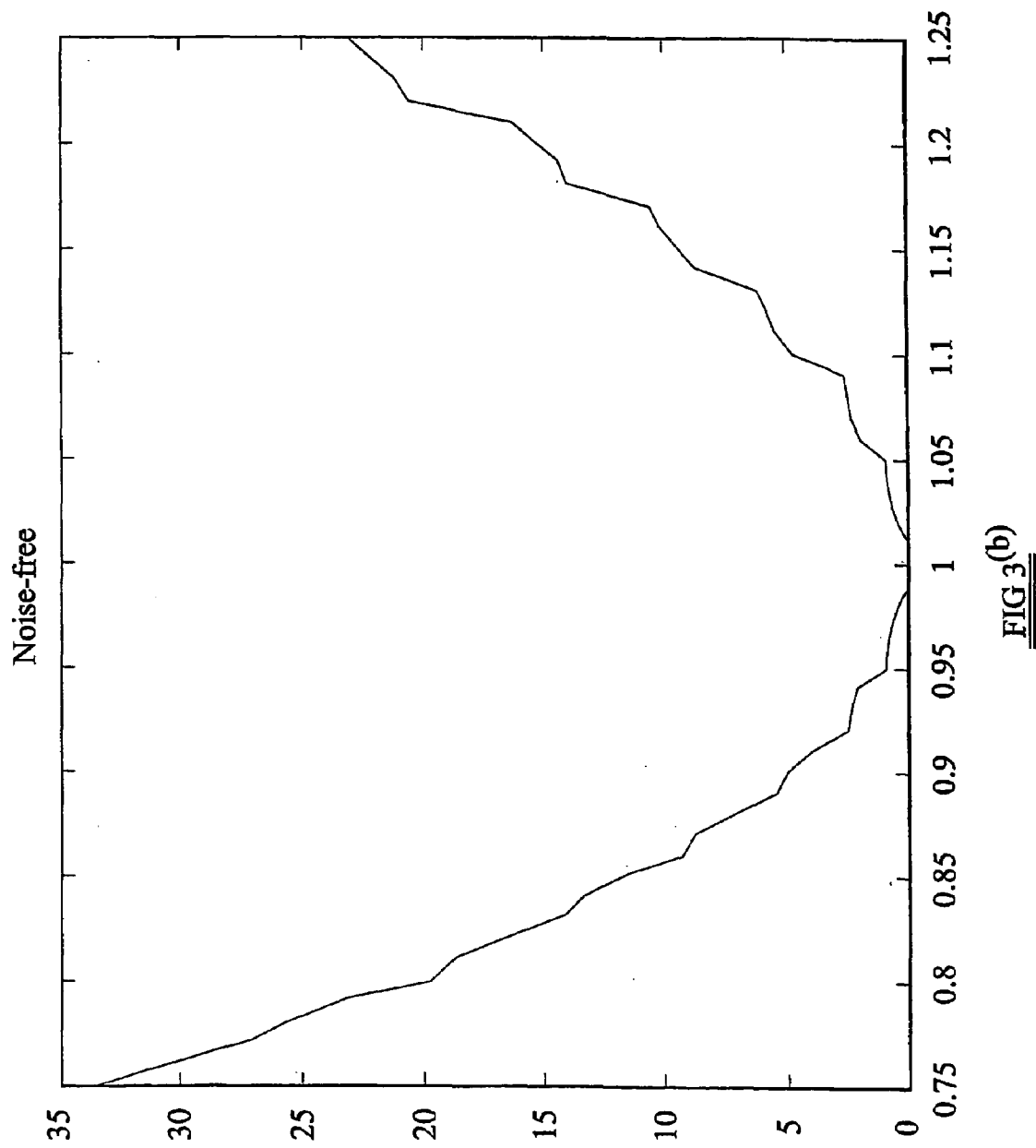
Figure 3C:
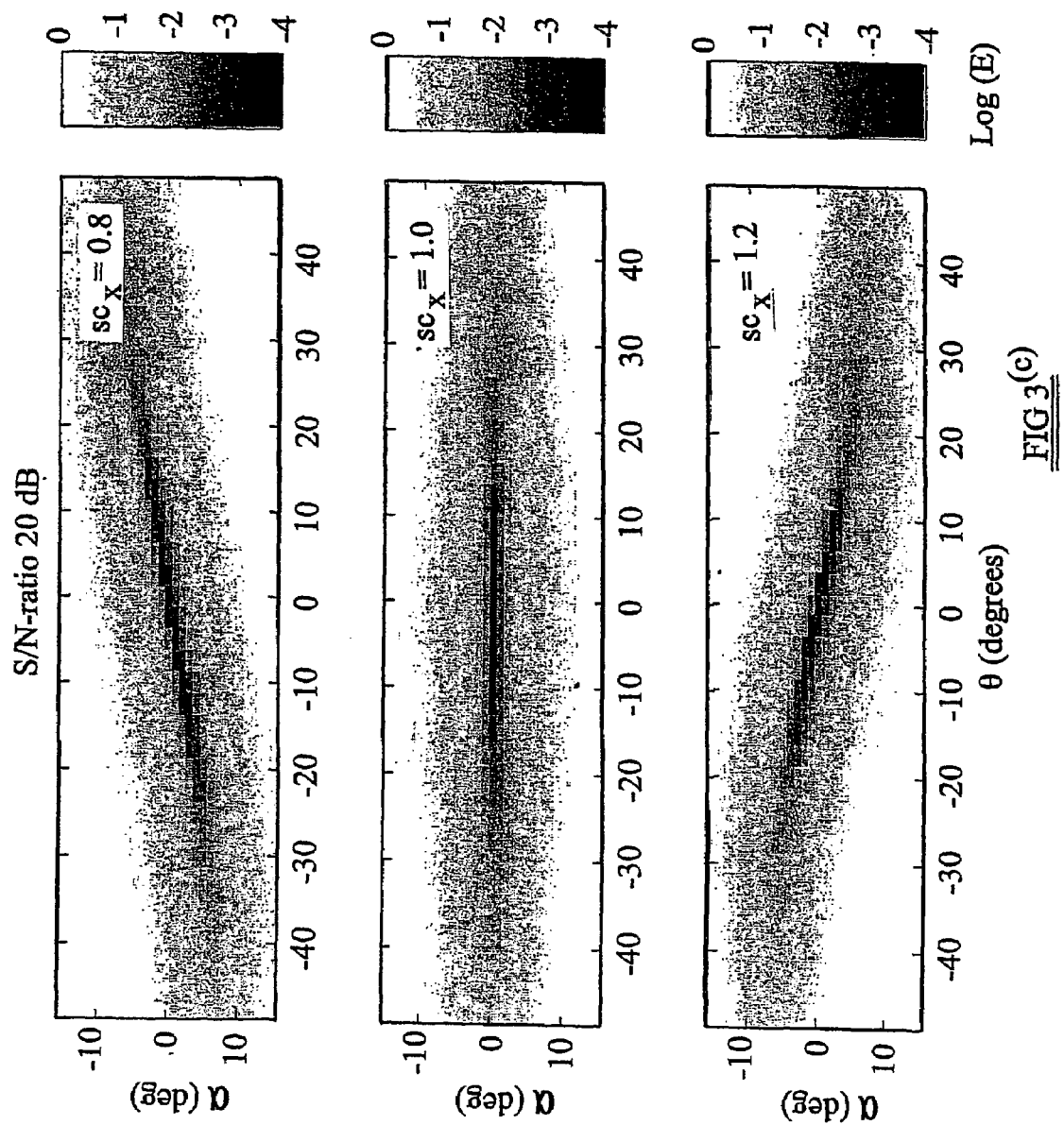
Figure 3D:
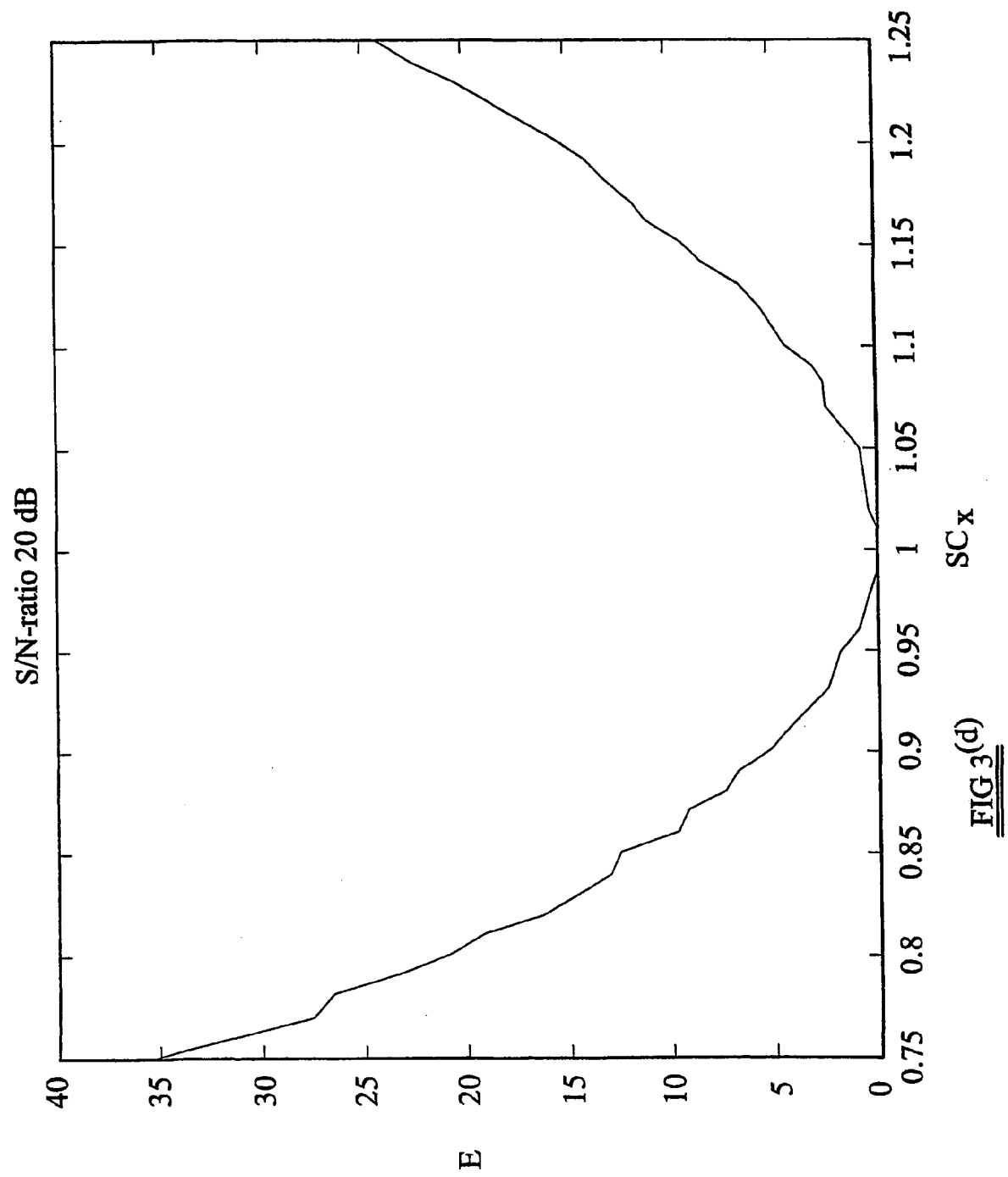
Figure 3E:
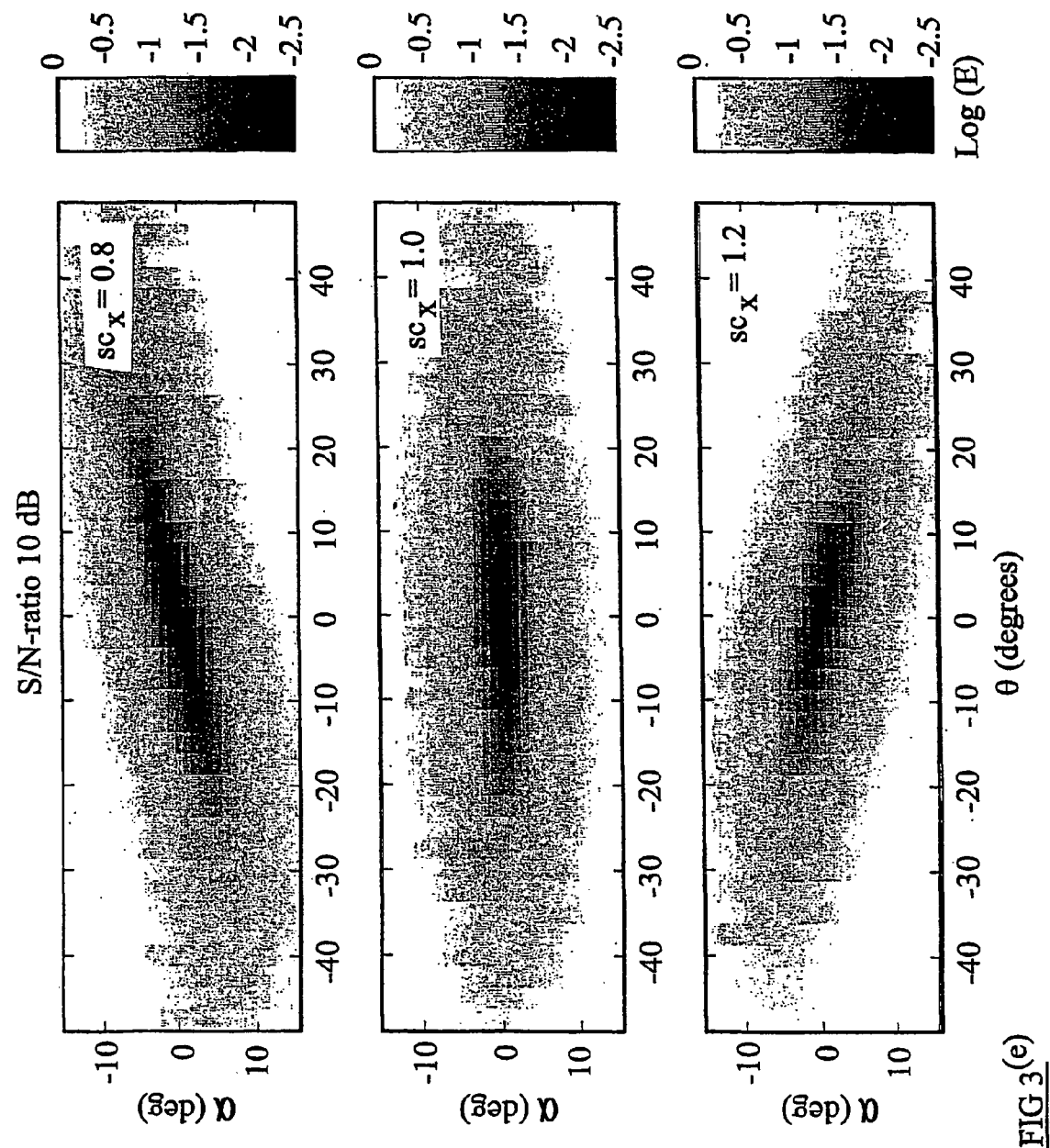
Figure 4:
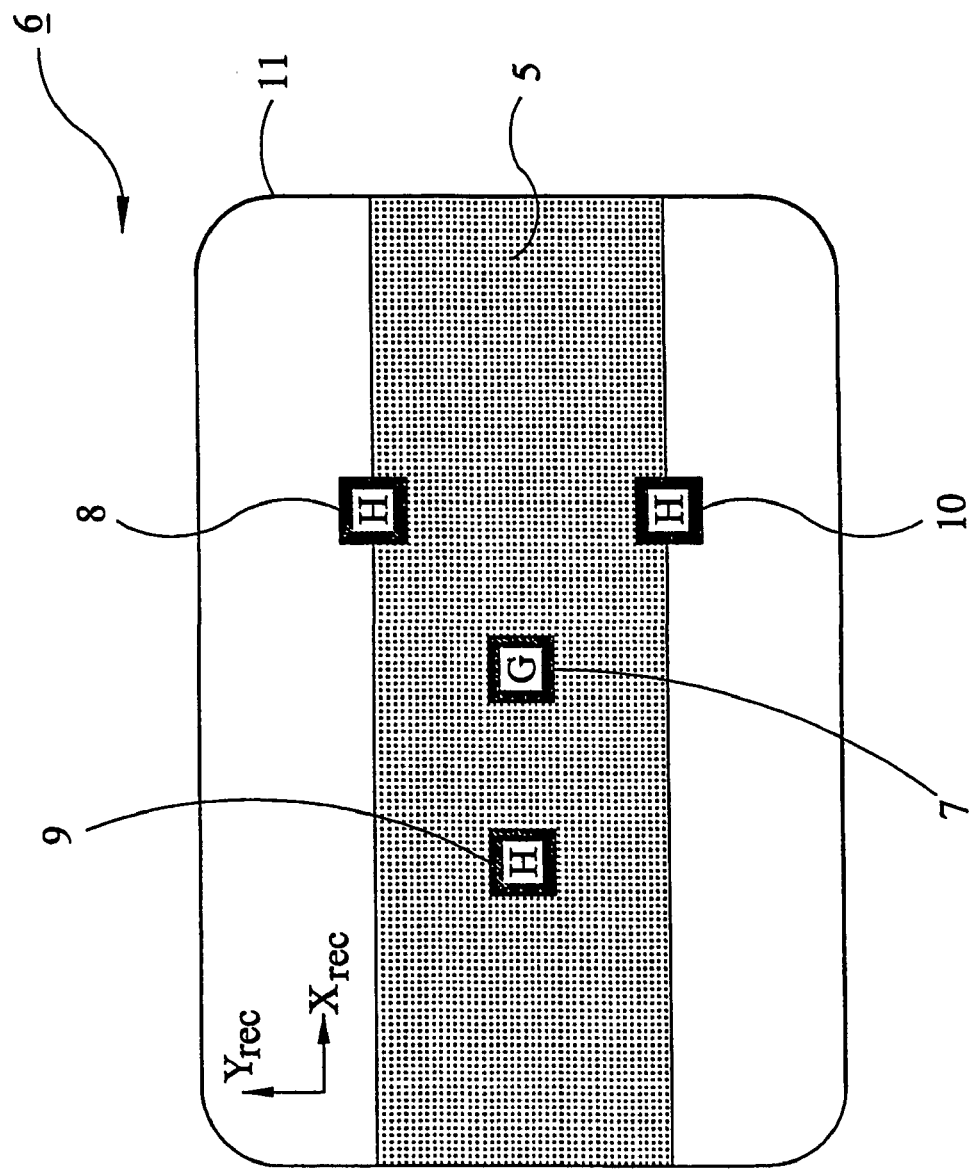

FIG. 3($c$) corresponds to FIG. 3($a$) but is for synthetic seismic data having a signal-to-noise ratio of 20 dB;

FIG. 3($d$) illustrates the second energy function for the data of FIG. 3($c$);

FIG. 3($e$) corresponds to FIG. 3($a$) but is for synthetic seismic data having a signal-to-noise ratio of 10 dB;

FIG. 3($f$) illustrates the second energy function for the data of FIG. 3($e$); and FIG. 4 is a schematic illustration of a multi-component seismic receiver according to an embodiment of the present invention.

Figure 5:
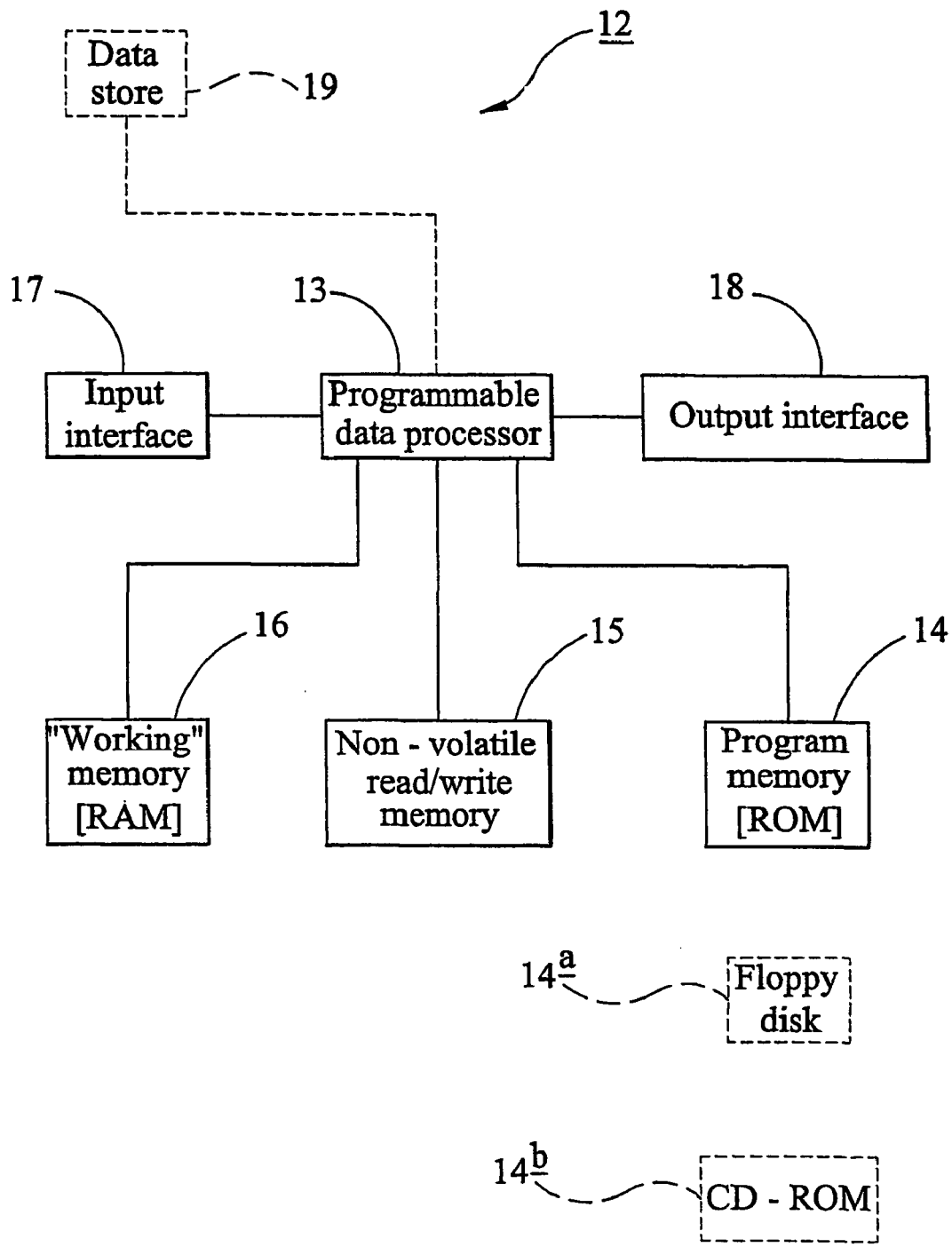

FIG. 5 is a schematic block diagram of an apparatus for performing a method according to the present invention.

In the method of the present invention the receiver orientation in a horizontal plane (this is known as the "receiver heading"), is determined from seismic or acoustic data acquired by the receiver. Information about at least one of the pressure at the receiver and the particle displacement, or a time derivative thereof, at the receiver is obtained from the data, and the receiver heading is determined from this information. In a preferred embodiment of the invention the spatial derivatives in two different horizontal directions of the pressure at the receiver are used in the determination of the receiver heading. The two directions are preferably perpendicular, and it will be assumed that the two directions are perpendicular in the following description of an embodiment of the invention.

Figure 1:
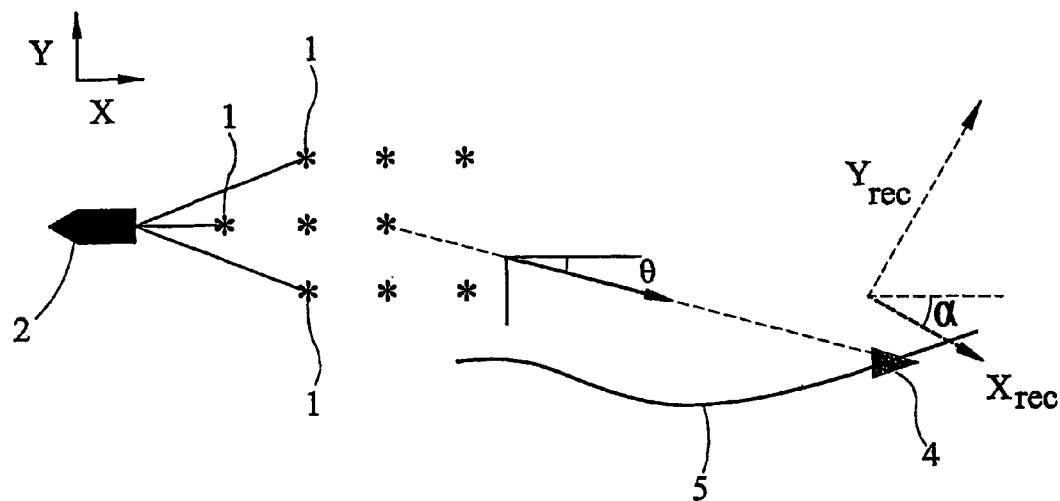
FIG. 1 is a schematic plan view of a first marine seismic surveying arrangement suitable for carrying out a method of the invention.

FIG. 1 is a schematic plan view of a marine seismic survey. A seismic source 1 is being towed by a survey vessel 2. As the seismic source is towed through the water it is actuated to emit a pulse of seismic energy at each shot point 3. The distance between successive shot points 3 is equal to the product of the speed of the vessel 2 and the time interval between successive actuations of the source 1. The direction of travel of the vessel 2 is defined to be the x-direction.

The seismic energy emitted by the seismic source 1 is received at a multi-component seismic receiver 4 mounted on a support cable 5. The receiver 4 contains sensing elements for sensing the components of the wavefield in two orthogonal horizontal directions. These directions are the receiver's internal x- and y-axes, and will be referred to as the directions $x_{rec}$ and $y_{rec}$ respectively. The receiver 4 also contains a pressure sensing element.

The orientation of the receiver's internal x- and y-axes $x_{rec}$, $y_{rec}$ relative to the x- and y-axes defined by the direction of movement of the boat (hereinafter referred to as the "global x-axis" and "global y-axis") is unknown. The angle between the receiver x-axis $x_{rec}$ and the global x-axis is denoted by $\alpha$.

The direction of propagation, or azimuth, of an incoming wave in the horizontal plane can be obtained from the horizontal spatial derivatives of either pressure P or displacement u. The angle between the azimuth of the wave and the positive global x-direction is shown as $\theta$ in FIG. 1. The azimuth can be determined from:

$$\tan\theta = \frac{\partial_x P}{\partial_y P} = \frac{\partial_x u_i}{\partial_y u_i}, \quad (1)$$

In equation (1), the notation $\partial_i$ denotes differentiation with respect to the variable 'i', and $u_i$ denotes the $i^{th}$ component of the displacement (i=x, y or z).

As may be seen from FIG. 1, the azimuth of the wave can be determined, in principle, from spatial derivatives of either the pressure or the displacement measured at the receiver 4. However, the pressure recorded at a receiver is independent of the receiver heading, since the pressure is a scalar quantity. Moreover, the measured pressure is generally less susceptible to variations from receiver-to-receiver in the coupling between a receiver and the elastic medium (e.g. the sea-floor or the ground) below or around the receiver than is the measured particle displacement. In preferred embodiments of the invention, therefore, the orientation of the receiver is determined from derivatives of the pressure rather than from derivatives of the displacement.

In the absence of seismic energy polarised out of the horizontal plane (this may arise owing to $s_h$-energy or shear wave splitting), it is the case that $$\partial_x u_y - \partial_y u_x = 0, \quad (2)$$

and using the following expressions for the components of the horizontal slowness p in the x- and y-directions, respectively:

$$p_x = \frac{\partial_x P}{\partial_t P} = \frac{\partial_x u_i}{\partial_t u_i} = \frac{\partial_x u_i}{v_i}; \quad p_y = \frac{\partial_y P}{\partial_t P} = \frac{\partial_y u_i}{\partial_t u_i} = \frac{\partial_y u_i}{v_i}, \quad (3)$$

it is possible relate the horizontal spatial derivatives of pressure to the horizontal components of particle velocity, as follows:

$$\frac{v_x}{v_y} = \frac{\partial_x P}{\partial_y P}. \quad (4)$$

Equation (4) allows the sensor heading to be determined. It can be re-written as:

$$v_x \partial_y P - v_y \partial_x P = 0 \quad (5)$$

The receiver 4 will record the components of the particle velocity along the $x_{rec}$- and $y_{rec}$-axes, and will also record the pressure. Moreover the seismic surveying arrangement allows the spatial derivatives $\partial_{xrec} P$ and $\partial_{yrec} P$ of the pressure to be determined, as will be discussed below. If the quantity $v_{xrec}\partial_{yrec}P - v_{yrec}\partial_{xrec}P$ is computed, it should be zero if the receiver x- and y-axes are aligned with the global x- and y-axes but will be non-zero if the receiver x- and y-axes are not exactly aligned with the global x- and y-axes.

To determine the heading of the receiver, therefore, the quantity $v_{xrec}\partial_{yrec}P - v_{yrec}\partial_{xrec}P$ is computed. If the quantity $v_{xrec}\partial_{yrec}P - v_{yrec}\partial_{xrec}P$ should be zero this indicates that the receiver x- and y-axes are aligned with the global x- and y-axes, and that the angle a is equal to zero. If the initial computation of the quantity $v_{xrec}\partial_{yrec}P - v_{yrec}\partial_{xrec}P$ should be non-zero, however, this shows that the receiver axes are not in alignment with the global x- and y-axes. In this case, $v_{xrec}\partial_{yrec}P - v_{yrec}\partial_{xrec}P$ is recomputed for a new set of receiver $x_{rec}$- and $y_{rec}$-axes for which the angle $\alpha$ has some non-zero value, and this process is repeated until a value of the angle $\alpha$ is found that gives a value for the quantity $v_{xrec}\partial_{yrec}P - v_{yrec}\partial_{xrec}P$ of zero, or acceptably close to zero.

Since it is not known whether the initial calculation of $v_{xrec}\partial_{yrec}P - v_{yrec}\partial_{xrec}P$ will give a positive or negative value, a preferred way of determining the receiver heading is to find the value of the angle $\alpha$ that minimises the cost function, or energy function, $E_1 = (v_{xrec}\partial_{yrec}P - v_{yrec}\partial_{xrec}P)^2$. $E_1$ will never be negative, and this simplifies iterative techniques for determining the angle $\alpha$.

Once the value of the angle a has been determined, the spatial derivatives of the pressure along the global x- and y-axes can be computed from the pressure derivatives along the receiver's x- and y-axes. The azimuth $\theta$ of the wave can then be determined using equation (1).

The above method can be carried out using any suitable computational technique.

The above description of the method has assumed that the receiver is oriented so that its z-axis is vertical. In many cases this assumption will be correct, because deployment of the cable is more likely to cause errors in the orientation of the receiver's x- and y-axes than in the orientation of the receiver's z-axis. Furthermore, many seismic receivers now incorporate sensing elements mounted on gimbals so that correct orientation of the z-axis of the receiver is ensured. If, however, it is known or suspected that the receiver's z-axis may not be vertical it is possible to pre-process the data acquired by the receiver to correct for the mis-orientation of the z-axis before applying the method of the invention to determine the sensor heading. For example, any projection of a vertical component onto the $x_{rec}$ and $y_{rec}$ components of data recorded by the receiver can be removed by calibrating the recorded data against the equation of motion using the technique disclosed by K. M. Schalkwijk, C. P. A. Wapenaar, and D. J. Verschuur, in "Application of two-step decomposition to multi-component ocean-bottom data: Theory and case study," *J. Seism. Expl.*, Vol. 8, pp261–278 (1999).

As noted above, the derivation of equation (4) assumed that no seismic energy was polarised out of the horizontal plane. The determination of the receiver heading is therefore preferably performed on a portion of the seismic data for which this assumption is reasonable, by selecting a time-window of the seismic data in which the received seismic energy is unlikely to contain seismic energy polarised out of the horizontal plane. This can be done, for example, by selecting a time window which contains the direct wave (the wave that travels direct from the source 1 to the receiver 4). If it is assumed that the sea floor in the vicinity of the survey area is flat and that there is no azimuthal anisotropy, selecting a time window that contains water layer multiple reflections (that is, events that involve reflection at the sea surface and/or the sea-bed) should also ensure that the data used in the determination of the receiver heading is unlikely to contain seismic energy polarised out of the horizontal plane.

Once the orientation of the receiver has been determined by processing a selected portion of the seismic data, conventional processing steps can be applied to the seismic data These subsequent processing steps are able to take account of the determined orientation of the receiver. Subsequent processing steps can be applied to the entire seismic data, or to one or more selected portions of the seismic data.

In the above description, the receiver heading has been determined from seismic data acquired at the receiver. The invention is not limited to determining the receiver heading from seismic data, and the receiver heading may also be determined from acoustic data acquired by the receiver. Setting up a seismic survey generally involves the step of acquiring acoustic data at the receivers, to verify that the receivers are located at their desired survey locations. This preliminary acoustic data can be used in the determination of the receiver heading by a method of the invention. The receiver heading determined from the acoustic data can be used in the processing of seismic data subsequently acquired by the receiver.

It is also possible to acquire seismic or acoustic data specifically for the purpose of determining the receiver heading.

As noted above, in a real receiver one of the horizontal sensing elements may measure the component of the wavefield more accurately than the other horizontal sensing elements so a calibration filter $a(\omega)$ is generated to calibrate one horizontal sensing element against the other. Uncertainties in the calibration of the horizontal sensing elements introduce an ambiguity between the receiver heading and the required calibration filter $a(\omega)$. In such a case, the cost function $E_1$ should be minimised for data acquired over a number of shots covering a specific range of azimuths, rather than for data acquired at a single shot. Care should however be taken to minimise problems that might arise owing to azimuthally varying calibration filters, by selecting data for shots covering only a limited range of azimuths at a time.

Once the sensor heading has been determined it is then possible to calibrate the measured pressure against the horizontal components of the particle velocity. This is done in a similar way to the determination of the sensor heading but, instead of having the sensor heading as an unknown variable, frequency dependent filters $a(\omega)$ and $b(\omega)$ are convolved with the x and y components of the particle velocity. Since the sensor heading is known it is possible to solve for $a(\omega)$ and $b(\omega)$, and this allows the x and y components of the particle velocity to be calibrated against the pressure.

Any information about the calibration filters for the horizontal components obtained here is, in principle, available for quality control purposes during the acquisition stage. It can also be used during the subsequent processing of the acquired seismic data The spatial derivatives in horizontal directions of the pressure can be obtained explicitly either by comparing data acquired at one receiver for two different source positions (source side derivatives), or by comparing data acquired at adjacent receivers for a single shot (receiver side derivatives), provided the data have been acquired with sufficiently small source or receiver spacing, respectively.

Figure 2:
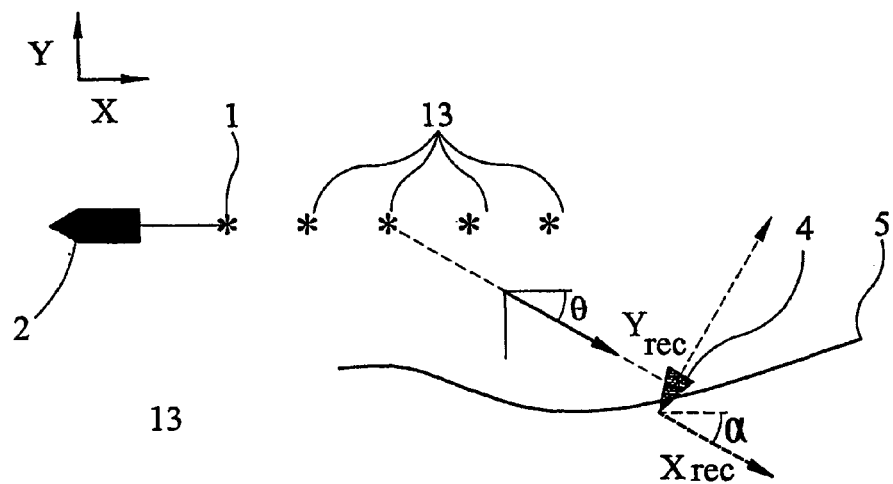
FIG. 2 is a schematic plan view of a second marine seismic surveying arrangement suitable for carrying out a method of the invention.

FIGS. 1 and 2 shows possible seismic surveying arrangements for carrying out the method of the invention. FIG. 1 shows a seismic surveying arrangement having a plurality of seismic sources (three sources 1,1,1 are shown in FIG. 1), in this example towed by a vessel 2. The resulting pattern of shot points is not linear, as would be the case for a single source, but is a two-dimensional array, and this allows the horizontal derivatives of the pressure to be estimated on the source side so that the receiver 4 used in the seismic surveying arrangement of FIG. 1 may be a conventional 4-component receiver.

The seismic surveying arrangement of FIG. 2 has only a single seismic source so that the horizontal derivatives of the pressure must be estimated on the receiver side, for example by using a receiver of the type described below with reference to FIG. 4.

The receiver 4 in FIGS. 1 and 2 may be disposed on the sea-bed, or it could be towed through the water.

The method of the present invention requires only the phase differences between different recordings (that is, between recording of the same event at different spatially separated receivers or between recordings at one receiver of similar events from different, spatially separated sources). The phase differences can be obtained by determining the lag of the maximum of the cross-correlation of these recordings. The phase difference $\phi_i$ thus obtained is equal to the product of the slowness $p_i$ of the incoming wave and the source or receiver spacing $\Delta_i$, where the subscript i denotes the direction (x or y) of the source or receiver separation. Assuming plane waves, the spatial gradients can be related to the temporal derivatives in the following way:

$$\partial_i P = \frac{\varphi_i}{\Delta_i} \partial_t P,$$

$$\partial_i u_i = \frac{\varphi_i}{\Delta_i} \partial_t u_i.$$

Inserting the above in equation (5), and eliminating the time-derivatives allows us to write an alternative formulation of the cost function $E_1$, namely:

$$E_1 = \left( \frac{\varphi_x v_y}{\Delta x} - \frac{\varphi_y v_x}{\Delta y} \right)^2.$$

Up-sampling of the data prior to cross-correlation will increase the accuracy of the estimated phase-differences.

In principle, in this embodiment the sensor heading could be determined by calculating the quantity $(\phi_x v_{xrec}/\Delta_x - \phi_y v_{yrec}/\Delta_y)$ and finding the orientation of the receiver axes that makes this quantity zero. In practice, as explained above, it is more convenient to find the orientation of the receiver axes from the square of this quantity.

A conventional 4-component seismic receiver contains geophones for recording the three components of the elastic wavefield (these are generally embodied as a single multi-component geophone) and a hydrophone for recording the pressure. Since the pressure is recorded at only a single location it is not possible to obtain the spatial derivatives of the pressure on the receiver side if such a receiver is used. Such a conventional receiver could be used in the surveying arrangement of FIG. 1 in which the derivatives of the pressure are determined on the source side.

Once seismic data has been acquired in a seismic survey that uses a seismic surveying arrangement as shown in FIG. 1 or 2, the receiver heading can be determined from the acquired seismic data using a method as described above. The determination of the receiver heading is conveniently done by processing a portion of the acquired seismic data, for example the time window containing the direct arrival. Once the receiver heading has been determined, some or all of the acquired seismic data can be processed in any conventional manner taking account of the determined receiver heading.

FIG. 4 is a schematic illustration of a seismic receiver that is suitable for obtaining the spatial derivatives of the pressure on the receiver side, and so is suitable for use in the surveying arrangement of FIG. 2. The receiver 6 of FIG. 4 has a multi-component sensor 7 for recording three orthogonal components of the particle displacement, particle velocity or particle acceleration (in principle the multi-component sensor could record components of higher order time-derivatives of the particle displacement), and also has at least three hydrophones (or other suitable pressure sensors). Three hydrophones 8,9,10 are shown in FIG. 4, but in principle more than three hydrophones could be provided. The multi-component sensor 7 and the hydrophones 8,9,10 are disposed in a housing 11.

The method of determining the receiver heading from the acquired data requires knowledge of only the x- and y-components of the particle displacement (or of the particle velocity etc), so the sensor 7 could in principle measure only the x- and y-components of the particle displacement (or of the particle velocity etc). Preferably, however, the sensor 7 is a three-component sensor so that the vertical component of the particle displacement (or of the particle velocity etc) can be acquired. The multi-component sensor 7 is preferably a multi-component geophone although, in principle, a plurality of single-component geophones could be used instead of a multi-component geophone.

FIG. 4 also shows the support cable 5. The receiver 6 may be coupled to the support cable 5 as in conventional receiver cable systems, or it may be decoupled from the support cable. Electrical connections from the support cable 5 to the sensor 7 and the hydrophones 8,9,10 have been omitted from FIG. 4 for clarity.

FIG. 4 shows only one receiver 6, but in practice a large number of receivers would be provided on the support cable 5, at intervals along the length of the cable.

The hydrophones 8,9,10 of the seismic receiver 6 are distributed over the horizontal plane in a non-collinear manner, so that the hydrophone distribution has a finite extent in both the $x_{rec}$ and $y_{rec}$ dimensions. The hydrophones preferably lie in a common horizontal plane. This hydrophone distribution makes it possible to obtain the derivatives of the pressure in the $x_{rec}$ and $y_{rec}$ directions, by comparing the pressure values recorded at two or more of the hydrophones. For example, an estimate of $\partial_{y_{rec}} P$ can be obtained by subtracting the pressure recorded at the hydrophone 10 from the pressure recorded at the hydrophone 8, and dividing by the distance between the two hydrophones.

The accuracy of the estimate of the derivatives of pressure improves as the separation between the hydrophones is reduced. The separation between neighbouring hydrophones is therefore preferably of the order of centimetres, in which case the receiver 6 can be said to have a spatially dense areal distribution of hydrophones.

FIGS. 1 and 2 show the receiver 4 in a marine seismic survey. A receiver of the present invention is not limited to use in marine seismic surveying, however but could also be used, for example, in a land-based seismic survey or deployed in a borehole. In addition to use in the method of the present invention, a seismic receiver of the invention is also advantageous for other purposes in hydrocarbon exploration, including noise attenuation and providing quality control measures for seismic data.

An example of the method of the invention will now be illustrated by means of synthetic seismic data generated with a reflectivity code according to the method described by B. L. N. Kennett, in "Seismic wave propagation in stratified media" *Cambridge University Press*, Cambridge, England (1983). These synthetic seismic data were simulated for a seismic surveying arrangement of the type shown in FIG. 2 in which the pressure derivatives are obtained on the receiver side. The data input to the method consists of a time-window containing the direct arrival only. The simulation was performed for a receiver oriented with its $x_{rec}$- and $y_{rec}$-axes coincident with the global x- and y-axes (i.e., for $\alpha=0$). The synthetic seismic data produced in the simulation included the pressure, the spatial derivatives of the pressure along the $x_{rec}$- and $y_{rec}$-axes, and the components of the particle velocity along the $x_{rec}$- and $y_{rec}$-axes.

The middle frame of FIG. 3(a) shows a cross-section through the cost function $E_1$ over an azimuth range of $-45°<\theta<+45°$. The darkest areas of FIG. 3(a) represent areas where the cost function is lowest. The cost function $E_1$ is calculated for noise-free synthetic seismic data, and is calculated over the range $-10°<\alpha<+10°$. Since the simulation was carried out on the assumption that the receiver axes were aligned with the global axes, the minimum of the cost function $E_1$ should occur at $\alpha=0$. The central frame of FIG. 3(a) shows that the minimum of the cost function does indeed occur at $\alpha=0$, over the entire azimuth range studied. The sensor heading is well defined and can be estimated accurately for all azimuths of the incoming wave.

The upper and lower frames of FIG. 3(a) illustrate the effect of incorrect calibration of the sensing elements for recording the horizontal components of the particle velocity. The simulations of these frames were performed using the same noise-free synthetic data as used to generate the central frame. The effect of incorrectly calibrated sensing elements were simulated by applying a calibration filter to the in-line horizontal component of the measured particle velocity ($v_x$). A simple calibration filter was used in the simulation, consisting of multiplying the in-line horizontal component of the measured particle velocity by a scalar factor $sc_x$ before computing $E_1$. The top and bottom frames of FIG. 3(a) show cross-sections through $E_1$ obtained from synthetic data in which $v_x$ has been multiplied by a scalar factor $sc_x=0.8$ (upper frame) and by a scalar factor $sc_x=1.2$ (lower frame). It will be seen that the minimum of $E_1$ does not occur at zero (except at $\theta=0$) in the upper and lower frames—incorrect calibration of the sensing elements leads to an error with a cosine-type behaviour in the estimated sensor heading.

The estimated orientation of the sensor should be identical for all azimuths of the incoming wave. Thus, if the calculation of the cost function $E_1$ should lead to results of the form shown in the upper or lower frame of FIG. 3(a) and so show that the calibration of the sensing elements is incorrect, it is possible to use this fact to determine the calibration factor required to calibrate the sensing elements correctly. This may be done by finding the calibration factor that minimises the variation of the estimated sensor heading with azimuth, and this can be done by finding the calibration factor that minimises the variance, or some other parameter indicative of the variation, of the estimated sensor heading with azimuth. That is, the correct calibration factor is the calibration factor that minimises a second cost function $E_2$:

$$E_2 = \text{var}(\min(E_1)).$$

FIG. 3(b) shows the second cost function $E_2$ as a function of $sc_x$, for the data of FIG. 3(a). As expected, FIG. 3(b) shows that the required calibration factor in the simulation of FIG. 3(a) is $sc_x=1.0$. FIG. 3(b) shows that the desired calibration factor is well constrained and can be estimated accurately.

In the example of FIGS. 3(a) and 3(b) the effect of incorrectly calibrated sensing elements has been simulated by a calibration filter that is simply a constant factor $sc_x$. In a practical seismic survey the calibration filter is likely to be more complicated than this. However, the correct calibration filter can still be found by determining the variation of the estimated sensor heading with azimuth. The correct calibration filter is the calibration filter that minimises the variation of the estimated sensor heading with azimuth.

FIGS. 3(c) and 3(e) correspond generally to FIG. 3(a), but were obtained for synthetic seismic data in which the partial derivatives of the pressure and the components of the particle velocity contain white noise. The results of FIG. 3(c) were obtained for synthetic seismic data having a signal-to-noise ratio of 20 dB and FIG. 3(e) were obtained for synthetic seismic data having a signal-to-noise ratio of 10 dB. FIGS. 3(d) and 3(f) show the second cost function $E_2$ for the data of FIGS. 3(c) and 3(e) respectively. In all these numerical examples, the sensor heading could be estimated well within an accuracy of 0.5 degrees. The form of the second cost function $E_2$ is generally unaffected by the addition of noise to the synthetic data, although the minimum value of $E_2$ occurs slightly away from $sc_x=1.0$ in FIG. 3(f).

The methods of calibrating the two horizontal sensing elements proposed by Gaiser (supra) and Bagaini et al (supra) are both based upon minimisation of energy transverse to the radial-vertical plane, where the radial direction is defined by the source and receiver co-ordinates. These methods require that the source and receiver co-ordinates are known, so that the radial direction can be determined, but this will not always be the case.

The present invention can be applied to these prior art calibration methods. The present invention allows the direction of the azimuth (θ) of the seismic wave angle to be determined, and this angle defines the radial direction. Thus the invention allows the radial direction for each shot to be determined separately, thus avoiding the possible inaccuracies associated with the use of estimated source and receiver co-ordinates.

The present invention has been described above with reference to marine seismic surveying methods in which the receivers are deployed on a sea-bed cable. The present invention is not, however, limited to marine seismic surveying. The method of determining the orientation of a sensor can in principle be applied to any multi-component seismic receiver such as, for example, seismic receiver deployed on land, a seismic receiver that is towed through water, and a seismic receiver deployed in a borehole. The method of calibrating the horizontal sensing elements of a seismic receiver can, in principle, also be applied to any seismic receiver. Moreover, the seismic receiver of the invention is not limited to use in OBC (ocean-bottom cable) seismic surveying arrangements but can be used in any conventional seismic surveying arrangement.

In the example of the invention described above, the sensor heading is determined using spatial derivatives of the pressure in two different horizontal directions and using two horizontal components of the particle velocity. However, the invention is not limited to using components of the particle velocity. In its broadest form, the invention determines the sensor heading from information about at least one of the pressure measured at the receiver and the particle displacement, or a derivative thereof, measured at the receiver. In the above example, the first cost function $E_1$ contains components of the particle velocity (that is, components of the time-derivative of the particle displacement). However, the components of the particle velocity in the first cost function $E_1$ could be replaced by components of the particle displacement, to produce an alternative first cost function $E'_1$ $$E'_1 = (u_{xrec}\partial_{yrec}P - u_{yrec}\partial_{xrec}P)^2$$

where $u_{xrec}$, $u_{yrec}$ are the components of particle displacement along the receiver's x- and y-axes. The sensor heading may be determined by finding the orientation of the receiver x- and y-axes that minimises the cost function $E'_1$.

Alternatively, the components of the particle velocity in the first cost function $E_1$ could be replaced by components of the particle acceleration (that is, the second time-derivative of the particle displacement), to produce a further alternative first cost function $E''_1$ $$E''_1 = (a_{xrec}\partial_{yrec}P - a_{yrec}\partial_{xrec}P)^2$$

where $a_{xrec}$, $a_{yrec}$ are the components of particle acceleration along the receiver's x- and y-axes. The sensor heading may be determined by finding the orientation of the receiver x- and y-axes that minimises the cost function $E''_1$.

In principle, the components of the particle velocity in the first cost function $E_1$ could be replaced by components of the third or higher order time-derivative of the particle displacement.

Where the sensor heading is determined using the particle displacement or acceleration (or a higher time-derivative of the particle displacement), it is possible to calibrate the measured pressure against the components of the particle displacement, acceleration or higher time-derivative. This can be done using a calibration method similar to the method described above of calibrating the measured pressure against the horizontal components of the particle velocity once the sensor heading has been determined. That is, frequency dependent filters $a(\omega)$ and $b(\omega)$ are convolved with the x and y components of the particle displacement or acceleration (or higher time-derivative of the particle displacement) and, since the sensor heading is known, it is possible to solve for $a(\omega)$ and $b(\omega)$ and so allow the x and y components of the particle displacement or acceleration (or of a higher time-derivative of the particle displacement) to be calibrated against the pressure.

In the preferred embodiments described above, the receiver heading has been determined using horizontal spatial derivatives of the pressure at the receiver. In principle, horizontal spatial derivatives of the particle displacement at the receiver could be used in place of the spatial derivatives of the pressure. If this is done, the sensor heading may be found using cost functions analogous to the cost functions $E_1$, $E_1'$ and $E_1''$ above, but with the terms $\partial_{yrec}P$ and $\partial_{xrec}P$ replaced by $\partial_{yrec}u$ and $\partial_{xrec}u$. In principle the spatial derivatives of the particle displacement may be determined on the source side, for example by using a two-dimensional array of sources as in FIG. 1, or on the source side using a receiver analogous to that shown in FIG. 4 but having a two-dimensional array of particle displacement sensors.

FIG. 5 is a schematic block diagram of an apparatus 12 for performing a method according to the present invention. The apparatus comprises comprises a programmable data processor 13 with a program memory 14, for instance in the form of a read only memory ROM, storing a program for controlling the data processor 13 to perform, for example, a method as described hereinabove. The system further comprises non-volatile read/write memory 15 for storing, for example, any data which must be retained in the absence of power supply. A "working" or "scratchpad" memory for the data processor is provided by a random access memory (RAM) 16. An input interface 17 is provided, for instance for receiving commands and data. An output interface 18 is provided, for instance for displaying information relating to the progress and result of the method. Data for processing may be supplied via the input interface 17 or may optionally be provided by a machine-readable store 19.

The program for operating the system and for performing a method described hereinbefore is stored in the program memory 14, which may be embodied as a semi-conductor memory, for instance of the well-known ROM type. However, the program may be stored in any other suitable storage medium, such as magnetic data carrier 14a (such as a "floppy disc") or CD-ROM 14b.

The invention claimed is:

1. A method of determining the orientation of a seismic receiver, the method comprising: acquiring seismic or acoustic data at a receiver, the data including at least one of pressure and the particle displacement or a time-derivative of the particle displacement; and determining the orientation of the receiver from at least one of the pressure measured at the receiver and the particle displacement or time-derivative of the particle displacement measured at the receiver; wherein the step of determining the receiver orientation comprises: determining the spatial derivatives in first and second horizontal directions of at least one of the pressure at the receiver, the particle displacement at the receiver or a time derivative of the particle displacement at the receiver, the first direction being different from the second direction.

2. The method of claim 1, wherein the step of determining the orientation of the receiver comprises determining the orientation of the receiver in a horizontal plane.

3. The method of claim 1, wherein the step of determining the receiver orientation comprises determining components of the particle displacement at the receiver in the first and second horizontal directions.

4. The method of claim 1, wherein the step of determining the receiver orientation comprises determining components of the particle velocity at the receiver in the first and second horizontal directions.

5. The method of claim 1, wherein the step of determining the receiver orientation comprises determining components of the particle acceleration at the receiver in the first and second horizontal directions.

6. The method of claim 5, wherein the step of determining the receiver orientation comprises determining the quantity, $v_{xrec}\partial_{yrec}P - v_{yrec}\partial_{xrec}P$, where $v_{xrec}$ and $v_{yrec}$ are the components along the receiver's x-axis and y-axis respectively of the particle velocity measured at the receiver, and $\partial_{xrec}P$ and $\partial_{yrec}P$ are the derivatives along the receiver's x-axis and y-axis respectively of the pressure measured at the receiver.

7. The method of claim 6, further comprising the step of determining an orientation of the receiver's x- and y-axes that give a value of approximately zero for $v_{xrec}\partial_{yrec}P - v_{yrec}\partial_{xrec}P$.

8. The method of claim 6, further comprising the step of determining an orientation of the receiver's x- and y-axes that minimizes the function $E_1 = (v_{xrec}\partial_{yrec}P - v_{yrec}\partial_{xrec}P)^2$.

9. The method of claim 1, wherein the step of determining the receiver orientation comprises determining the quantity $(\phi_x v_{xrec}/\Delta_x - \phi_y v_{yrec}/\Delta_y)$ where $v_{xrec}$ and $v_{yrec}$ are the components along the receiver's x-axis and y-axis respectively of the particle velocity measured at the receiver, $\phi_i$ is a phase difference, and $\Delta 1$ is the source or receiver spacing in the $i^{th}$ direction.

10. The method of claim 1, further comprising the step of determining the variation of the receiver orientation with azimuth.

11. The method of claim 10, further comprising the step of determining a calibration filter than minimises the variation of the receiver orientation with azimuth.

12. An apparatus for determining the orientation of a seismic receiver from seismic or acoustic data acquired at the receiver, the data including at least one of pressure and the particle displacement or a time-derivative of the particle displacement; the apparatus comprising means for determining the orientation of the receiver from at least one of the pressure measured at the receiver and the particle displacement or time-derivative of the particle displacement measured at the receiver, the apparatus comprising means for determining the spatial derivatives in first and second horizontal directions of at least one of the pressure at the receiver, the particle displacement at the receiver or a time derivative of the particle displacement at the receiver, the first direction being different from the second direction.

13. The apparatus of claim 12, further comprising means for determining the orientation of the receiver in a horizontal plane.

14. The apparatus of claim 12, further comprising means for determining components of the particle displacement at the receiver in the first and second horizontal directions.

15. The apparatus of claim 12, further comprising means for determining components of the particle velocity at the receiver in the first and second horizontal directions.

16. The apparatus of claim 12, further comprising means for determining components of the particle acceleration at the receiver in the first and second horizontal directions.

17. The apparatus of claim 16, further comprising means for determining the quantity $v_{xrec}\partial_{yrec}P - v_{yrec}\partial_{xrec}P$ where $v_{xrec}$ and $v_{yrec}$ are the components along the receiver's x-axis and y-axis respectively of the particle velocity measured at the receiver, and $\partial_{xrec}P$ and $\partial_{yrec}P$ are the derivatives along the receiver's x-axis and y-axis respectively of the pressure measured at the receiver.

18. The apparatus of claim 17, further comprising means for determining an orientation of the receiver's x- and y-axes that give a value of approximately zero for $v_{xrec}\partial_{yrec}P - v_{yrec}\partial_{xrec}P$.

19. The apparatus of claim 17, further comprising means for determining an orientation of the receiver's x- and y-axes that minimizes the function $E_1 = (v_{xrec}\partial_{yrec}P - v_{yrec}\partial_{xrec}P)^2$.

20. The apparatus of claim 12, further comprising means for determining the quantity $(\phi_x v_{xrec}/\Delta_x - \phi_y v_{yrec}/\Delta_y)$ where $v_{xrec}$ and $v_{yrec}$ are the components along the receiver's x-axis and y-axis respectively of the particle velocity measured at the receiver, $\phi_i$ is a phase difference, and 66$_i$ is the source or receiver spacing in the $i^{th}$ direction.

21. The apparatus of claim 12, further comprising a programmable data processor.

22. A seismic surveying arrangement comprising: a seismic receiver; and an apparatus as claimed in claim 12 for processing seismic data acquired by the receiver; wherein the seismic receiver comprises three or more pressure sensing elements, the positions of the pressure sensing elements not being collinear.

23. The seismic surveying arrangement of claim 22, wherein the pressure sensing elements of the seismic receiver lie in a common plane.

24. The seismic surveying arrangement of claim 22, wherein the separation between any two of the pressure sensing elements is of the order of centimeters.

25. The seismic surveying arrangement of claim 22, wherein the receiver comprises sensing elements for measuring two horizontal components of particle velocity.

26. The seismic surveying arrangement of claim 25, wherein the receiver further comprises a sensing element for measuring the vertical component of particle velocity.

27. The seismic surveying arrangement of claim 25, wherein the sensing elements for measuring the components of particle velocity comprise a multi-component geophone.

28. A storage medium containing a program for a data processor of an apparatus as claimed in claim 22.

* * * * *